United States Patent
Park et al.

(10) Patent No.: US 8,649,282 B2
(45) Date of Patent: Feb. 11, 2014

(54) SYSTEM AND METHOD FOR COMBINED MAC LEVEL MESSAGE WITH CQI CHANNEL CONTROL MESSAGE FOR CHANNEL FEEDBACK REPORT

(75) Inventors: Sungki Park, Ashburn, VA (US); Masoud Olfat, Great Falls, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 737 days.

(21) Appl. No.: 12/762,701

(22) Filed: Apr. 19, 2010

(65) Prior Publication Data

US 2011/0255428 A1    Oct. 20, 2011

(51) Int. Cl.
- H04J 1/16    (2006.01)
- H04J 3/14    (2006.01)
- H04L 1/00    (2006.01)
- H04L 12/26   (2006.01)
- H04W 4/00    (2009.01)

(52) U.S. Cl.
USPC ............................................ 370/252; 370/329

(58) Field of Classification Search
None
See application file for complete search history.

(56) References Cited

U.S. PATENT DOCUMENTS

| | | | |
|---|---|---|---|
| 7,933,195 B2 * | 4/2011 | Kim et al. ................... 370/204 |
| 2006/0148411 A1 * | 7/2006 | Cho et al. .................. 455/67.13 |
| 2007/0155392 A1 * | 7/2007 | Cho et al. .................. 455/450 |
| 2007/0254595 A1 * | 11/2007 | Yoon et al. ................. 455/67.14 |
| 2009/0061887 A1 * | 3/2009 | Hart et al. .................. 455/450 |
| 2009/0109910 A1 * | 4/2009 | Kim et al. ................... 370/329 |
| 2009/0130985 A1 * | 5/2009 | Lee et al. .................. 455/67.11 |
| 2009/0163144 A1 * | 6/2009 | Nakatsugawa ............. 455/67.13 |
| 2009/0303900 A1 * | 12/2009 | Cho et al. ................... 370/252 |
| 2010/0085931 A1 * | 4/2010 | Suk et al. ................... 370/329 |
| 2010/0159921 A1 * | 6/2010 | Choi et al. .................. 455/425 |
| 2010/0182961 A1 * | 7/2010 | Kim et al. ................... 370/329 |
| 2010/0215012 A1 * | 8/2010 | Cho et al. ................... 370/329 |
| 2011/0014909 A1 * | 1/2011 | Han et al. ................... 455/423 |
| 2011/0158123 A1 * | 6/2011 | Kim et al. ................... 370/252 |
| 2012/0093103 A1 * | 4/2012 | Lee et al. ................... 370/329 |

* cited by examiner

Primary Examiner — Suk Jin Kang
(74) Attorney, Agent, or Firm — Pillsbury Winthrop Shaw Pittman LLP (57) ABSTRACT

In one or more embodiments, a system and method of managing network channel quality in a wireless communications network includes reporting a channel quality measurement from the particular user to a base station (BS) over an available CQICH, and determining a MCS based, at least in part, upon the channel quality measurement. If a threshold network CQICH capacity is reached during a subsequent data frame such that a CQICH is no longer available, MAC level messages are generated between the BS and the particular user to trigger reporting of signal quality information to the BS by the particular user. After the next CQICH cycle commences and if a CQICH is still unavailable, the signal quality information is continued to be provided via MAC level messages. Otherwise, a CQICH is reallocated for a particular user and channel quality measurement reporting is transitioned back to the CQICH.

18 Claims, 6 Drawing Sheets

FIG. 1 (BACKGROUND)

SYSTEM AND METHOD FOR COMBINED MAC LEVEL MESSAGE WITH CQI CHANNEL CONTROL MESSAGE FOR CHANNEL FEEDBACK REPORT

BACKGROUND

This disclosure is generally related to high speed wireless packet-based data networks and devices. In particular, this disclosure is related to devices that are at least capable of operating in fourth generation ("4G") wireless networks. Examples of 4G wireless technologies include Worldwide Interoperability for Microwave Access ("WiMAX") technologies and Long Term Evolution (LTE) technologies. 4G next-generation networks are characterized by reliance upon the Internet Protocol (IP) and packet-based signaling, along with improved uplink/downlink modulation coding schemes (MCS) and data rates.

International Mobile Telecommunications-2000 (IMT-2000), better known as "3G" or 3rd Generation, is a family of standards for wireless communications defined by the International Telecommunication Union, which includes GSM EDGE, UMTS, and CDMA2000, as well as DECT. Services include wide-area wireless voice telephone, video calls, and wireless data, all in a mobile environment. Compared to earlier 2G and 2.5G services, 3G allows simultaneous use of speech and data services and higher data rates (up to 14.4 Mbit/s on the downlink and 5.8 Mbit/s on the uplink with certain enhancements). Thus, 3G networks enable network operators to offer users a wider range of more advanced services while achieving greater network capacity through improved spectral efficiency. Generally, 3G devices benefit from both a larger footprint coverage area, as well as national coverage.

International Mobile Telecommunications-Advanced (IMT Advanced), better known as "4G", "4th Generation", or "Beyond 3G", is the next technological strategy in the field of wireless communications. A 4G system may upgrade existing communication networks and is expected to provide a comprehensive and secure IP based solution where facilities such as voice, data and streamed multimedia will be provided to users on an "anytime, anywhere" basis, and at much higher data rates compared to previous generations. 4G devices provide higher speed and increased Quality of Service ("QoS") than their 3G counterpart devices. One 4G technology is WiMAX, a wireless system that adheres to the IEEE 802.16-2009 Air Interface for Fixed and Mobile Broadband Wireless Access System, which is the current updated "rollup" of 802.16-2004, 802.16-2004/Cor 1, 802.16e, 802.16f, 802.16g and P802.16i.

WiMAX systems present various traffic scheduling and QoS challenges. For example, the quality of the wireless channel is typically different for different users and randomly changes with time (on both slow and fast time scales). Further, wireless bandwidth is considered to be a scarce resource that needs to be used efficiently (i.e., you can not overprovision the wireless link). In addition, an excessive amount of interference and higher error rates are typically experienced. Scheduling decides the modulation coding scheme (MCS) and affects error rate, and error rate affects the choice of MCS. In general, mobility complicates resource allocation.

Another 4G system is "Long Term Evolution" (LTE), the project name of a high performance air interface for cellular mobile communication systems and is a step toward 4G radio technologies designed to increase the capacity and speed of mobile telephone networks. Where the current generation of mobile telecommunication networks are collectively known as 3G, LTE is marketed as 4G. However, it does not fully comply with the International Mobile Telecommunications (IMT) Advanced 4G requirements. Most major mobile carriers in the United States and several worldwide carriers have announced plans to convert their networks to LTE beginning in 2009. LTE is a set of enhancements to the Universal Mobile Telecommunications System (UMTS) which is introduced in 3rd Generation Partnership Project (3GPP) Release 8, with further enhancements in Release 9. These enhancements focus on adopting 4G mobile communications technology, including an all-IP flat networking architecture.

The LTE standard includes: For every 20 MHz of spectrum, peak download rates of 326.4 Mbit/s for 4×4 antennas, and 172.8 Mbit/s for 2×2 antennas; Peak upload rates of 86.4 Mbit/s for every 20 MHz of spectrum using a single antenna; Five different terminal classes have been defined from a voice centric class up to a high end terminal that supports the peak data rates. All terminals will be able to process 20 MHz bandwidth; At least 200 active users in every 5 MHz cell. (Specifically, 200 active data clients); Sub-5 ms latency for small IP packets; Increased spectrum flexibility, with spectrum slices as small as 1.5 MHz (and as large as 20 MHz) supported; Optimal cell size of 5 km, 30 km sizes with reasonable performance, and up to 100 km cell sizes supported with acceptable performance; Co-existence with legacy standards; Support for MBSFN (Multicast Broadcast Single Frequency Network) which can deliver services such as Mobile TV using the LTE infrastructure, and is a competitor for DVB-H-based TV broadcast; and Per-User Unitary Rate Control (PU2RC), an advanced MIMO technique, i.e., a practical solution for MU-MIMO, which effectively utilizes multiuser precoding and scheduling to enhance the system performance of multiple antenna networks will be handled in a future release, i.e., LTE Release 10 and beyond (LTE-Advanced). A large amount of the LTE development work is aimed at simplifying the architecture of the LTE system, as it transits from the existing UMTS circuit-switched/packet switched combined network, to an all-IP flat architecture system.

LTE uses OFDM for the downlink—that is, from the base station to the terminal. OFDM meets the LTE requirement for spectrum flexibility and enables cost-efficient solutions for very wide carriers with high peak rates. OFDM is a well-established technology, for example in standards such as IEEE 802.11a/g, 802.16, HIPERLAN-2, DVB and DAB. In the LTE downlink, there are three main physical channels. The Physical Downlink Shared Channel (PDSCH) is used for all the data transmission, the Physical Multicast Channel (PMCH) is used for broadcast transmission using a Single Frequency Network, and the Physical Broadcast Channel (PBCH) is used to send most important system information within the cell. Supported modulation formats on the PDSCH are Quadrature Phase Shift Keying (QPSK), 16 Quadrature Amplitude Modulation (QAM) and 64 QAM. For MIMO operation, a distinction is made between single user MIMO, for enhancing one user's data throughput, and multi user MIMO for enhancing the cell throughput.

In LTE's uplink, for the Physical Uplink Shared channel (PUSCH) only, LTE uses a pre-coded version of OFDM called Single Carrier Frequency Division Multiple Access (SC-FDMA). This is to compensate for a drawback with normal OFDM, which has a very high peak-to-average power ratio (PAPR). High PAPR requires expensive and inefficient power amplifiers with high requirements on linearity, which increases the cost of the terminal and drains the mobile station's battery faster. In LTE's uplink, there are three physical channels. While the Physical Random Access Channel (PRACH) is only used for initial access and when the User Equipment (UE) or MS is not uplink synchronized, all the data is sent on the Physical Uplink Shared Channel (PUSCH). If there is no data to be transmitted on Uplink for a UE, control information would be transmitted on the Physical Uplink Control Channel (PUCCH). Supported modulation formats on the uplink data channel are QPSK, 16 QAM and 64 QAM.

WiMAX and LTE have many similar futures. For example, WiMAX utilizes a Channel Quality Information (CQI) (e.g., over a CQI channel—CQICH), throughput, CINR, and MIMO that are all present in LTE. One difference is in the naming convention used for MIMO in LTE. In LTE, downlink MIMO-A is called "downlink transmit diversity", and MIMO-B, as it is defined in WiMAX, is called Multi-User-MIMO (MU-MIMO).

The SS can use a specific channel or a MAC message to transmit signal quality information periodically or when a specific condition is satisfied. For example, in WiMAX, the specific channel includes a CQI channel (CQICH), and the MAC message includes a REP-REQ/RSP MAC level management message.

In packet-switched circuits, "real-time" voice such as VoIP data, requires higher priority than other types of service flows to ensure adequate QoS. Conventional approaches do not optimize VoIP traffic. For example, in WiMAX, the CQICH is capacity-limited and cyclic, i.e., the physical maximum number of CQICH is 64 per frame. If all available CQI channels are fully occupied, then a CQI channel will not be able to be allocated until the next cycle is available. If the opportunity is missed, the MS has to wait for next cycle, e.g., every 2, 4, or 8 frames, depending upon the specific system implementation. An enhanced 6 bit CQI channel takes one slot from the UL subframe where one slot is 1 subchannel×3 symbols.

A BS can allocate a CQICH for a SS to an uplink and request downlink signal quality information from the SS. If a measured value of the downlink signal quality information transmitted from the terminal to the BS, the BS requests that the SS transmits downlink signal quality information via the CQICH channel.

In conventional WiMax, "Channel measurement Report Request" (REP-REQ) and "Channel measurement Report Response" (REP-RSP) (collectively, "REP-REQ/RSP") MAC messages may be used on an as-needed basis, and may be triggered when a CQICH is not available for additional users. A REP-REQ message is used when a BS requests DL channel measurement results such as RSSI and CINR information for a SS. The REP-RSP message is used by the SS in order to respond to channel measurements listed in a received REP-REQ message, and the SS transmits a channel measurement report response message including measurement results of channels listed in a REP-REQ received. When transmitting signal quality information using a MAC management message, if downlink signal quality information transmitted from a SS to a BS is less than a reference value, the BS allocates radio uplink resources to the SS.

The conventional scheme is to use REP-REQ/RSP (or MAC level messaging) once the capacity limit of CQICH is reached. In other words, some active users may be using CQICH, while other active users are using REP-REQ/RSP. The problem of this conventional approach is that there is no consistency in Physical Carrier-to-Interference and Noise Ratio (PCINR) reporting among active users. Unavailability of a CQI channel results in the SS not being able to report either the physical (or effective) CINR to the BS.

CQICH and REP-REQ/RSP are defined in the IEEE 802.16 Standard. Some Radio Access Network (RAN) vendors use CQICH until the maximum number of users is reached, and then REP-REQ/RSP is used for any additional users. However, CQICH and REP-REQ/RSP are not conventionally known to be adaptively switched back and forth for the same user.

What is needed is a system and method for a wireless device to overcome CQICH capacity limitations and which allows active users to provide consistent PCINR reporting without limiting the CQI cycle. What is further needed is a system and method for a wireless communications system that allows user reporting through REP-RSP to be switched back to CQICH if CQICH later becomes available.

SUMMARY

The apparatus and method of this disclosure provide various features, functions, and capabilities as discussed more fully in the detailed description. For example, this disclosure provides a novel and useful system and method for use in a communications system, with particular application in wireless telecommunication systems such as those adhering to the IEEE 802.16-2009 standard (fixed and mobile WiMAX), 3rd Generation Partnership Project (3GPP) Releases 8 and 9, and LTE-Advanced communication standard specifications and/or working group standards for WiMAX and LTE. However, this disclosure is not necessarily limited to use with such systems and methods.

In one or more embodiments, this disclosure is directed to a system and method useful for "4G" devices. More particularly, this disclosure is directed to a system and method for resolving the capacity issue of CQICH, in particular, a system and method for eliminating the capacity limitation in delivering PCINR for active users while holding CQICH across all active users. In one or more embodiments, there is no limitation on a CQI cycle. In other words, the Period (p) is not required to be a certain maximum number of frames.

One or more embodiments of this disclosure may be practiced by implementing software modifications to existing PCINR feedback mechanisms. The various embodiments disclosed herein generally may be realized by software enhancements to already existing 4G devices without requiring hardware modifications in the RAN.

In one embodiment, a method of managing network channel quality for a particular user in wireless communications network includes, if one of a plurality of channel quality information channels (CQICH) is available during a first data frame, reporting a channel quality measurement from the particular user to a base station (BS) over an available CQICH, and assigning a modulation coding scheme (MCS) based, at least in part, upon the channel quality measurement; if a threshold network CQICH capacity is reached during a subsequent data frame and if one of the plurality of CQI channels is not available, generating Medium Access Control (MAC) level messages between the BS and the particular user to trigger reporting of signal quality information to the BS by the particular user; receiving the reported signal quality information at the BS at least until a next CQICH cycle commences and determining whether one of the plurality of CQICH is available during the next CQICH cycle; if a CQICH is not available during the next CQICH cycle, continuing to receive the signal quality information via the MAC level messages or, otherwise, allocating an available CQICH for reporting the channel quality measurement from the particular user to the BS.

In another embodiment, a system for wireless packet-based communications includes a base station (BS) and a subscriber station (SS) arranged to communicate over a wireless network, wherein the BS is configured to: allocate an available channel quality information channel (CQICH) to the SS during a first data frame and, if a threshold network CQICH capacity is reached during a subsequent data frame such that a CQICH is not available to the SS, or if a CQICH is not available during the first data frame, generate a first Medium Access Control (MAC) level message to the SS to trigger reporting of signal quality information to the BS by the SS using a second MAC level message, and determine whether a different CQICH is available during a next CQICH cycle; wherein the SS is configured to: if a CQICH is available during the first data frame, report a channel quality measurement to the BS over the allocated CQICH, or responsive to the first MAC level message, report the signal quality information to the BS using the second MAC level message at least until the next CQICH cycle commences, and continue to report the signal quality information via the second MAC level messages if the different CQICH is not available during the next CQICH cycle.

In another embodiment, a network node in a wireless packet-based communications system includes a processor and memory operatively coupled to each other and to a network connection, wherein the processor is configured to: selectively transition channel signal quality reporting information related to a particular user back and forth between an available channel quality information channel (CQICH) and one or more Medium Access Control (MAC) level messages over the network connection in response to a CQICH being available during one or more data frames; either process the channel signal quality reporting information received via the MAC level message if a CQICH is unavailable, or process the channel signal quality reporting information received over the available CQICH; and determine a modulation coding scheme (MCS) for the particular user based, at least in part, upon the channel signal quality reporting information.

In another embodiment, a wireless communications apparatus includes a transceiver configured to selectively transmit and receive data over a wireless network; a processor operatively coupled to the transceiver and configured to: report channel signal quality information related to a particular user of the communications apparatus to a base station (BS) in response to an allocation of an available channel quality information channel (CQICH) to the particular user by the BS; report the channel signal quality information for the particular user to the BS over a Medium Access Control (MAC) level message in response to a CQICH being unavailable during one or more data frames; determine a modulation coding scheme (MCS) in the transceiver based upon a decision made by the BS in consideration of the reported channel signal quality information provided to the BS by the apparatus, wherein the processor is further configured to transition reporting of the channel signal quality information back and forth between the available CQICH and the MAC level message in response to instructions received from the BS over the wireless network.

In another embodiment, a computer-readable medium comprising computer readable code physically embodied thereon which, when executed by a processor arranged in fourth generation (4G) network node associated with a particular user causes the processor to carry out the functions of: selectively transitioning channel signal quality reporting information related to the particular user back and forth between an available channel quality information channel (CQICH) and one or more Medium Access Control (MAC) level messages over a network connection in response to a CQICH being available during one or more data frames; either processing the channel signal quality reporting information received via the MAC level message if a CQICH is unavailable, or processing the channel signal quality reporting information received over the available CQICH; and determining a modulation coding scheme (MCS) for the particular user based, at least in part, upon the channel signal quality reporting information.

DETAILED DESCRIPTION

In the discussion of various embodiments and aspects of the apparatus and method of this disclosure, examples of a processor may include any one or more of, for instance, a personal computer, portable computer, personal digital assistant (PDA), workstation, web-enabled mobile phone, WAP device, web-to-voice device, or other device. Further, examples of 4G devices or multimode 3G/4G devices, e.g., CDMA/WiMAX or CDMA/LTE devices, may include wireless phone handsets, smart phones, modems, laptop computers with embedded dual-mode functionality, mobile Internet devices such as used for video streaming, and other User Equipment (UE), for example.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Figure 1:
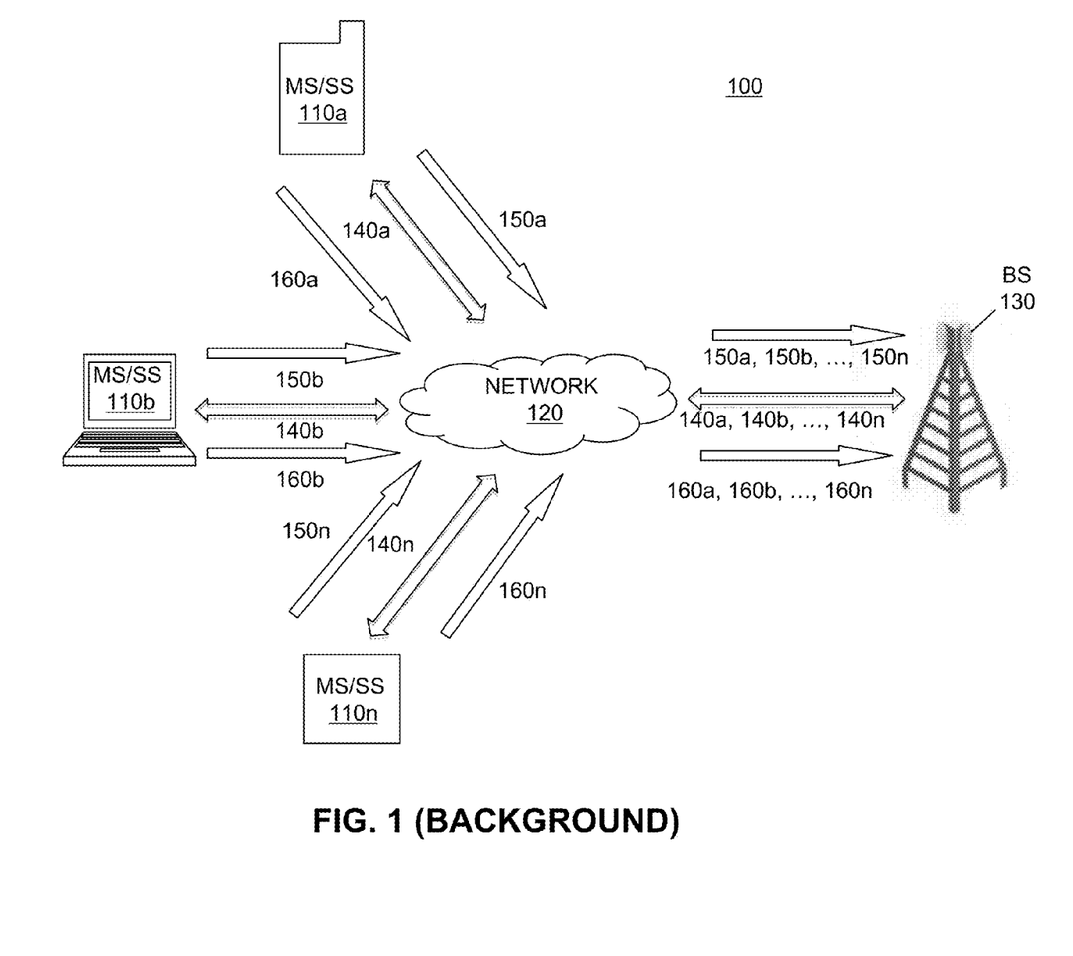
FIG. 1 provides a representation of a conventional network arrangement with multiple 4G devices operating therein in which may be adapted to employ the inventive concept disclosed herein.

FIG. 1 depicts the architecture of an exemplary 4G network, e.g., a WiMAX network, implemented in accordance with various aspects of IEEE Standard 802.16-2009. In FIG. 1, 4G BS 130 may communicate with one or more Mobile Stations/Subscriber Stations (MS/SS) 110a-110n either directly or over network 120 via an associated communication channel 140a-140n. The terms "SS" and "MS" may be used interchangeably, although it is recognized that MS implies the use of mobility enhancements. MS/SS 110a-110n (hereafter device 110) may be relatively fixed or immobile terminal equipment, or may be equipment that includes the mobility functions of a MS, e.g., a cell phone or laptop computer traveling in an automobile or airplane. Device 110 may be configured to operate in WiMAX and/or LTE networks, as well as in legacy 3G networks such as EvDO i.e., as a multi-mode device. Various factors such as the existence of ambient interference around the SS or BS, movement of the SS, and other factors may degrade or otherwise alter the channel condition of the communication channel, making the use of HARQ desirable to ensure reliable communications over channels 140a-140n. HARQ uplink Acknowledgement Channels (ACKCH) 150a-150n allow each device to acknowledge packet receipt to the BS by use of a HARQ signal transmission over a dedicated HARQ ACK channel. Channel Quality Indicator (CQI) channels 160a-160n provide a path for the MS or SS to identify the relative quality of the communication channel to BS 130 using known techniques.

Although not specifically illustrated, it should be understood that BS 130 contains various processors and memory devices and peripherals which may be used to carry out some or all of the functionality described herein. In other words, various aspects of this disclosure may be implemented in either a network base station or in a dual-mode communications device.

In WiMAX (and LTE) 4G networks, Channel Quality Indicator (CQI) is a measurement of the communication quality of a WiMAX wireless channel represented by a value (or values) that indicate a measure of channel quality for the given channel. Typically, a high value CQI is indicative of a channel with high quality. CQI for a channel can be computed by making use of a performance metric, such as a signal-to-noise ratio (SNR), e.g., a carrier-to-interference noise ratio (CINR). Physical CINR (PCINR) depicts the signal strength received by the 4G device, e.g., device 110 from the 4G BS 130. In WiMAX mode, device 110 sends a CQI based on the received CINR, which the base station translates to a data rate, and/or a Modulation and Coding Scheme (MCS) which is allocated based upon the CQI. The higher the MCS scheme, the better the data rate/throughput. For example, a communications system using orthogonal frequency division multiplexing (OFDM) can make use of a different CQI than a communications system that makes use of a different coding scheme. In more complex communications systems, such as those making use of multiple-input-multiple-output (MIMO) and space-time coded (STC) systems (e.g., MIMO-A in WiMAX) or spatial multiplexing (SM) (e.g., "MIMO-B" in WiMAX), the CQI used can also be dependent on receiver type. Other factors that may be taken into account in CQI are performance impairments, such as Doppler shift, channel estimation error, and interference.

In 4G LTE systems, the Modulation and Coding Scheme (MCS) may be allocated similarly to WiMAX. The higher the MCS scheme, the better the data rate/throughput. For example, a communications system using orthogonal frequency division multiplexing (OFDM) can make use of a different CQI than a communications system that makes use of a different coding scheme. In more complex communications systems, such as those making use of multiple-input-multiple-output (MIMO) and space-time coded (STC) systems (e.g., "downlink transmit diversity" in LTE) or spatial multiplexing (SM) (e.g., "Multi-User-MIMO" or "MU-MIMO" in LTE), the CQI used can also be dependent on receiver type. Other factors that may be taken into account in CQI are performance impairments, such as Doppler shift, channel estimation error, and interference.

In LTE, the time and frequency resources used by the user equipment (UE) to report CQI are under the control of the Evolved Node B (eNB). CQI reporting can be either periodic or aperiodic. A UE can be configured to have both periodic and aperiodic reporting at the same time. In the case where both periodic and aperiodic reporting occurs in the same subframe, only the aperiodic report is transmitted in that subframe. For efficient support of localized, distributed and MIMO transmissions, the Evolved UMTS Terrestrial Radio Access Network (E-UTRA) supports three types of CQI reporting: 1) Wideband type: providing channel quality information of entire system bandwidth of the cell; 2) Multi-band type: providing channel quality information of some subset(s) of system bandwidth of the cell; and 3) MIMO type: open loop or closed loop operation, with or without an index of a selected precoding matrix ("PMI feedback").

In LTE, periodic CQI reporting is defined by the following characteristics: 1) When the UE is allocated Physical Uplink Shared channel (PUSCH) resources in a subframe where a periodic CQI report is configured to be sent, the periodic CQI report is transmitted together with uplink data on the PUSCH. Otherwise, the periodic CQI reports are sent on the the Physical Uplink Control Channel (PUCCH). PUSCH is a data channel and PUCCH is a control channel. CQI reporting via PUSCH is similar to the use of REP-REQ/RSP in WiMAX, while CQI reporting via PUCCH is similar to the way of using CQICH channel in WiMAX.

Aperiodic CQI reporting is defined by the report being scheduled by the eNB via the Physical Downlink Control Channel (PDCCH) and is transmitted together with uplink data on PUSCH. CQI reporting via PUSCH is similar to the way of using REP-REQ/RSP in WiMAX. When a CQI report is transmitted together with uplink data on PUSCH, it is multiplexed with the transport block. The eNB configures a set of sizes and formats of the reports. Size and format of the report depends on whether it is transmitted over PUCCH or PUSCH, and whether it is a periodic or aperiodic CQI report.

Figure 2:
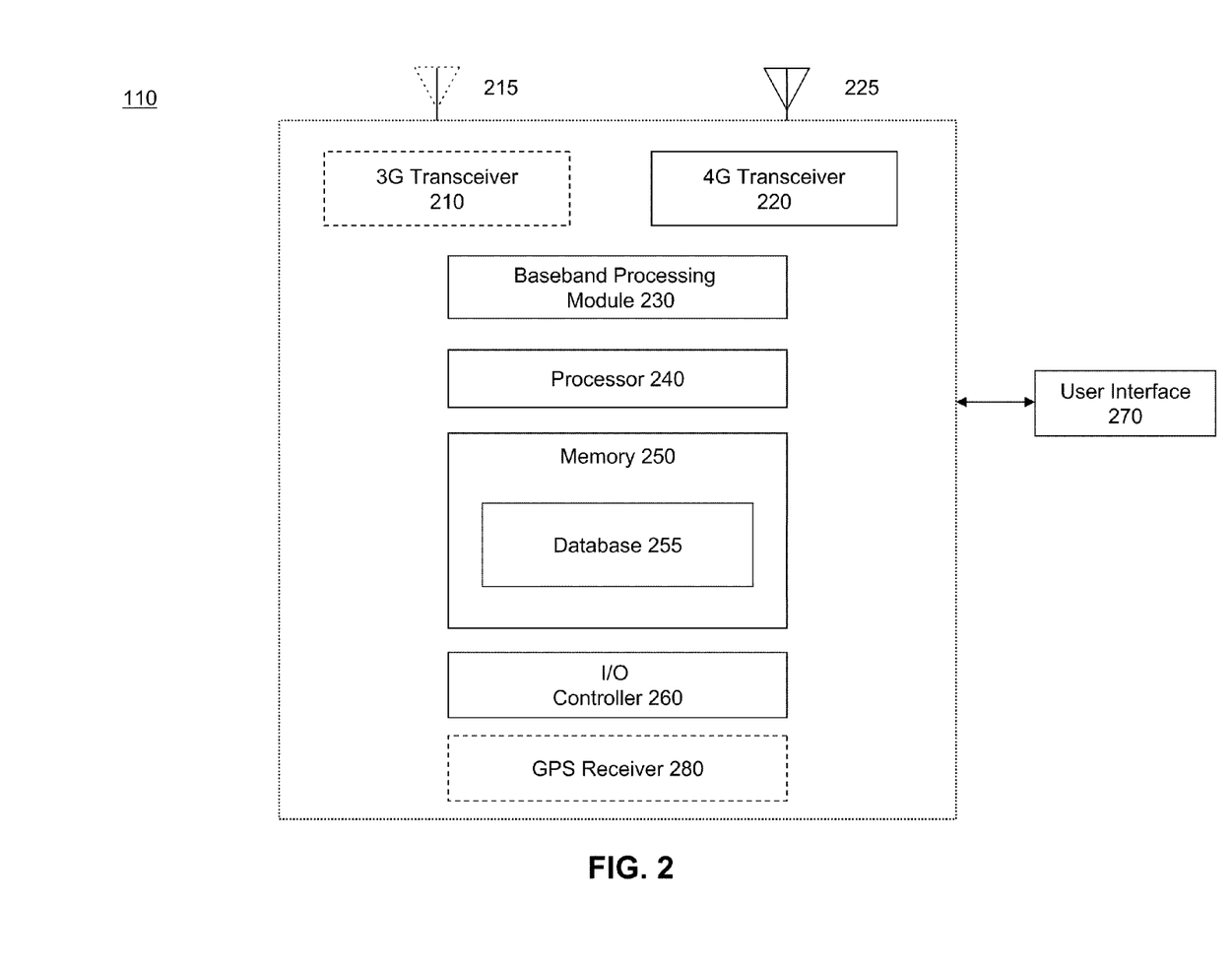
FIG. 2 provides a block diagram of an exemplary embodiment of a Subscriber Station (SS) of this disclosure.

In FIG. 2, an exemplary embodiment of device 110 includes optional (indicated by dashed lines) 3G transceiver 210 operatively connected to antenna 215, and 4G transceiver 220, operatively connected to antenna 225. Alternative arrangements using a single antenna for both service types are possible. Baseband processing module 230 is configured to convert radio frequency (RF) signals from 3G transceiver 210 and 4G transceiver 220 to baseband signals. Processor 240 may represent one or more processors configured to execute various functionality associated with processing of information received and/or transmitted from antennas 215 and/or 225, including processing of information used with conventional CQICH allocation or MAC level REP-REQ/RSP processing in one or more embodiments of this disclosure.

Memory 250 may be configured to store various data and program instructions, and may include structured database 255 configured to store various types of provisioning data. In addition, various flags and indices may also be stored with appropriate association and linking in the structured database 255. Input/output controller 260 may operate in conjunction with user interface 270 to allow display of information to a user, for example, as well as to receive input from the user using conventional input/output devices, among other purposes.

In one or more embodiments, the BS may request a measurement report by sending a REP-REQ message. This is typically done after the aggregated measurement time for one or more channels exceeds the required measurement time. Upon receiving a REP-REQ message, the SS replies with a REP-RSP message. The REP-RSP message is sent by the SS in response to a REP-REQ message from the BS to report measurement of DL physical CINR or effective CINR. The SS may also send a REP-RSP message in an unsolicited fashion.

BS allocates CQICH to users regardless of the period (p) in effect, e.g., $p=2^3=8$ frames maximum. For a particular user, if period p has to be greater than 8 frames, BS may reconfigure period p to greater than 8 frames, e.g., $p=2^4=16$, and put REP-REQ/RSP messaging on an 8 frames cycle in situations where CQICH is not available. However, the PCINR cycle is not limited to 8 frames when system is highly loaded.

Figure 4:
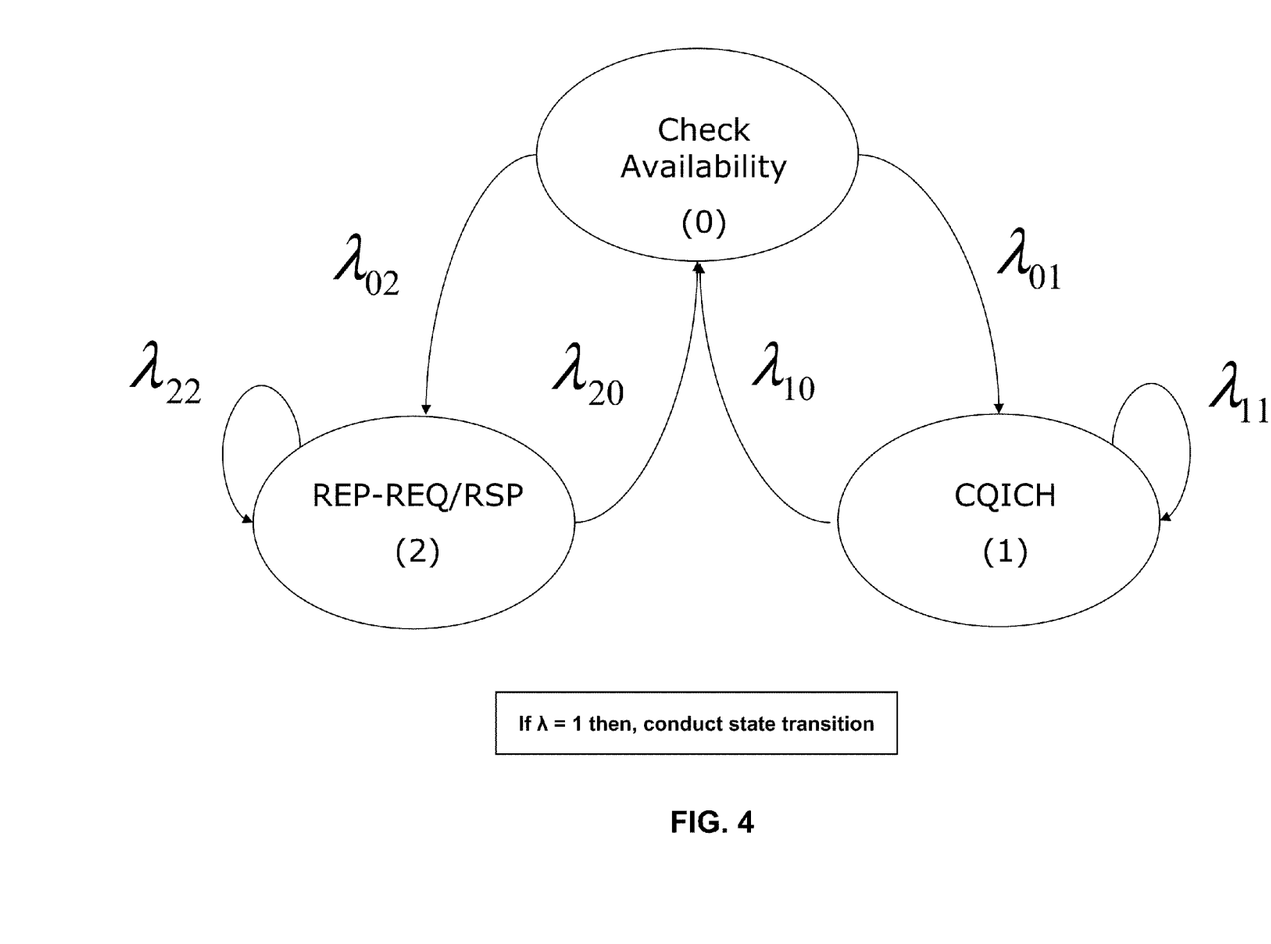
FIG. 4 provides an exemplary State Transition Diagram (STD) that illustrates transitions between states that use CQICH and states that use REP-REQ/RSP for the same user.
Figure 6:
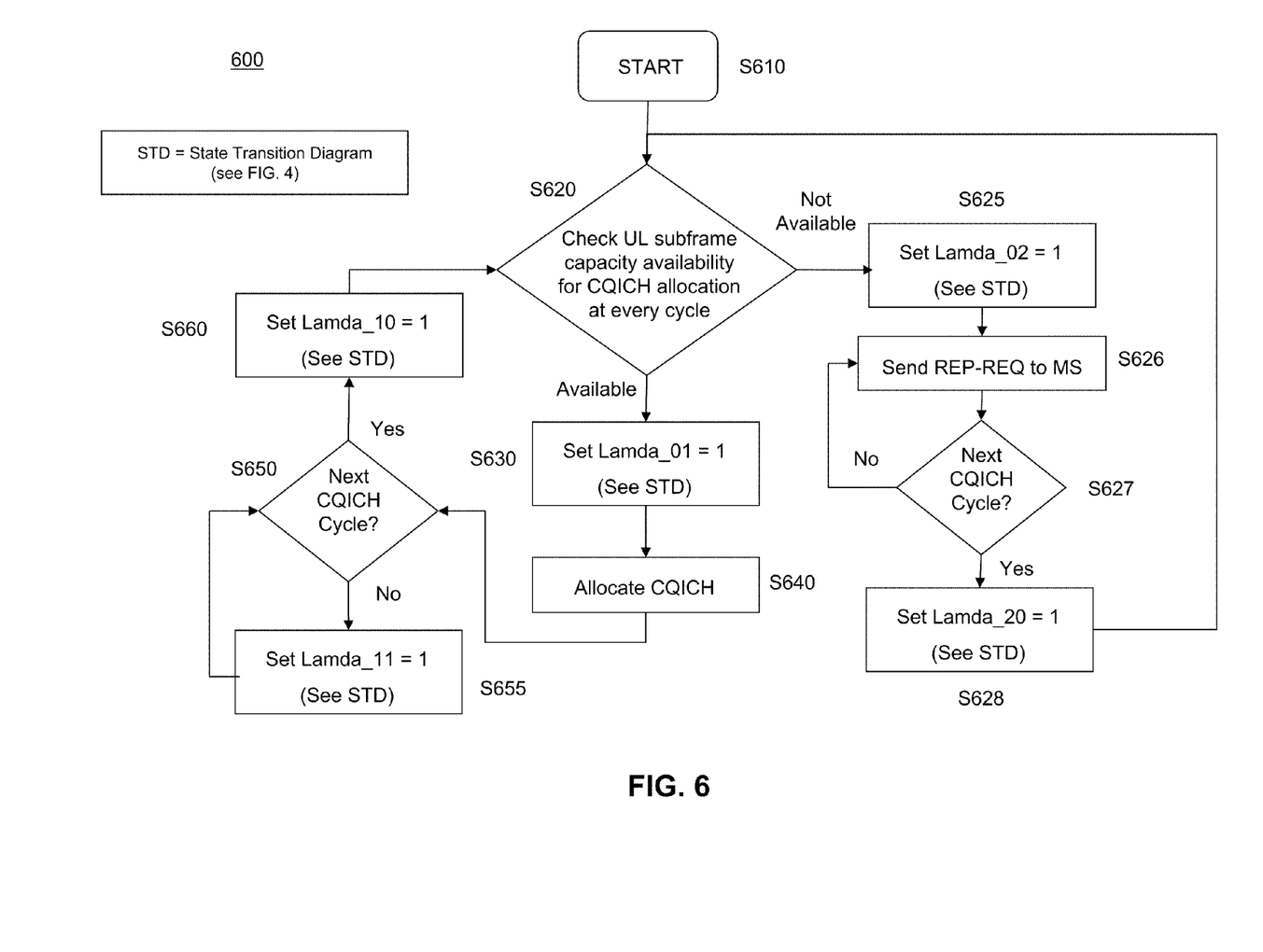
FIG. 6 schematically illustrates an exemplary flowchart of a method of this disclosure that trigger transitions between states which use CQICH and states that use REP-REQ/RSP for the same user.

Turning now to the State Transition Diagram (STD) of FIG. 4 and the flowchart of FIG. 6, a process for allocating a CQI channel commences at step S610. At step S620, available capacity in the UL subframe from a particular user SS to the BS is checked for CQICH allocation during every cycle. If there is sufficient CQICH capacity, state variable (Lambda) $\lambda\_01$ in FIG. 4 is set to a logical "1" at step S630, and a CQICH is allocated to the SS at step S640. Otherwise, if CQICH is not available, $\lambda\_02$ is set to be a logical "1" at step S625, and the BS sends a REP-REQ message to the MS or SS at step S626. Step S627 checks whether the next CQICH cycle has occurred. If "NO", another REP-REQ message is sent to the SS at step S626. If "YES", then $\lambda\_20$ is set to a logical "1" at step S628, and processing returns to step S620, where available capacity in the UL subframe from a particular user SS to the BS is checked for CQICH allocation, and the processing repeats as discussed above.

After a CQICH is allocated at step S640, step S650 checks whether the next CQICH cycle has occurred. If "NO", $\lambda\_11$ is set to a logical "1" at step S655, and CQICH reporting is maintained, at least through the current CQICH cycle. If the next CQICH cycle occurs, $\lambda\_10$ is set to a logical "1" at step S660, and processing returns to step S620, where available capacity in the UL subframe from a particular user SS to the BS is checked for CQICH allocation, and the processing repeats as discussed above.

Thus, FIGS. 4 and 6 illustrate a novel way of transitioning channel quality information reporting back and forth between a CQI channel message to MAC level messaging, and which is applicable to either WiMAX or LTE wireless communications systems. This contrasts to the conventional approaches discussed above in which CQICH and MAC level messaging is used for different users, but not for a particular user.

One difference between the system and method disclosed herein and conventional approaches is that either CQICH or REP-REQ/RSP, but not both, may be used conventionally for a particular user, while both methods are used for the same user in the method disclosed herein. Both methods/mechanisms, i.e., CQICH and REP-RSP may be used to get information regarding link quality for the same user, so that inconsistencies between PCINR reporting between users reporting via CQICH, and a REP-REQ/RSP mechanism are reduced. If CQICH were used for some users, if while REP-REQ/RSP were used for other users, inconsistencies could occur because CQICH is periodic, while REP-REQ/RSP is not.

Figure 3:
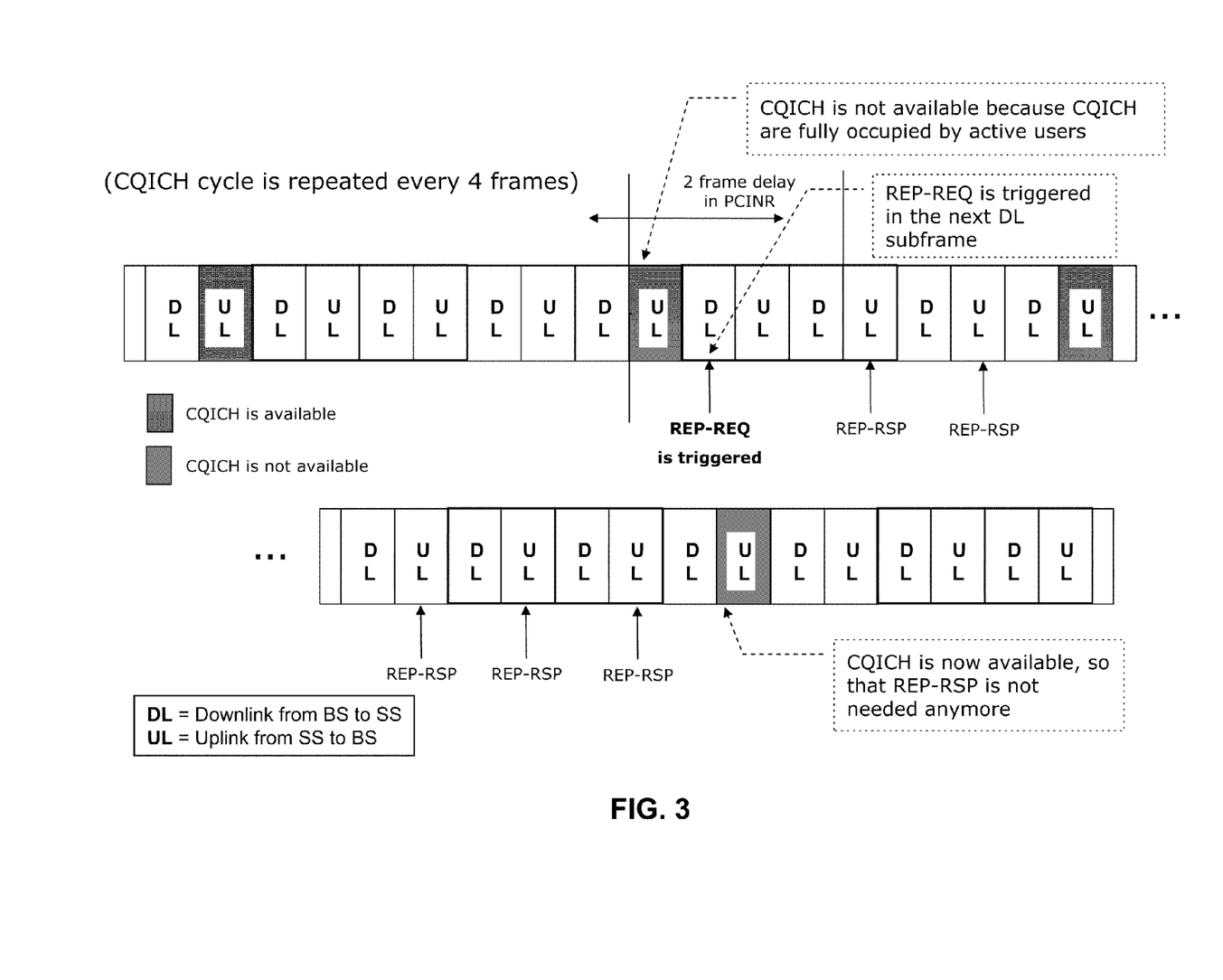
FIG. 3 provides an exemplary frame structure of a data stream of an embodiment of this disclosure that illustrates the concept of using both CQICH and REP-REQ/RSP techniques for the same user.

FIG. 3 illustrates exemplary data frame structure for a particular user (e.g., a SS) in which a CQICH cycle occurs every four subframes. The period may vary, depending on the vendor and specific system implementation. The diagonal hatched areas in FIG. 3 depict uplink (UL) subframes in which CQICH is available, and the horizontal hatched areas depict UL subframes in which CQICH is not available due to the CQICH being fully occupied by active users. As can be seen in FIG. 3, a MAC level message is triggered (e.g., a REP-REQ message in the case of WiMAX) in the downlink (DL) subframe immediately following the UL subframe in which CQICH is no longer available. The SS responds with a REP-RSP message in subsequent UL subframes until the BS determines that CQICH is again available so that REP-RSP messaging in no longer required.

Figure 5:
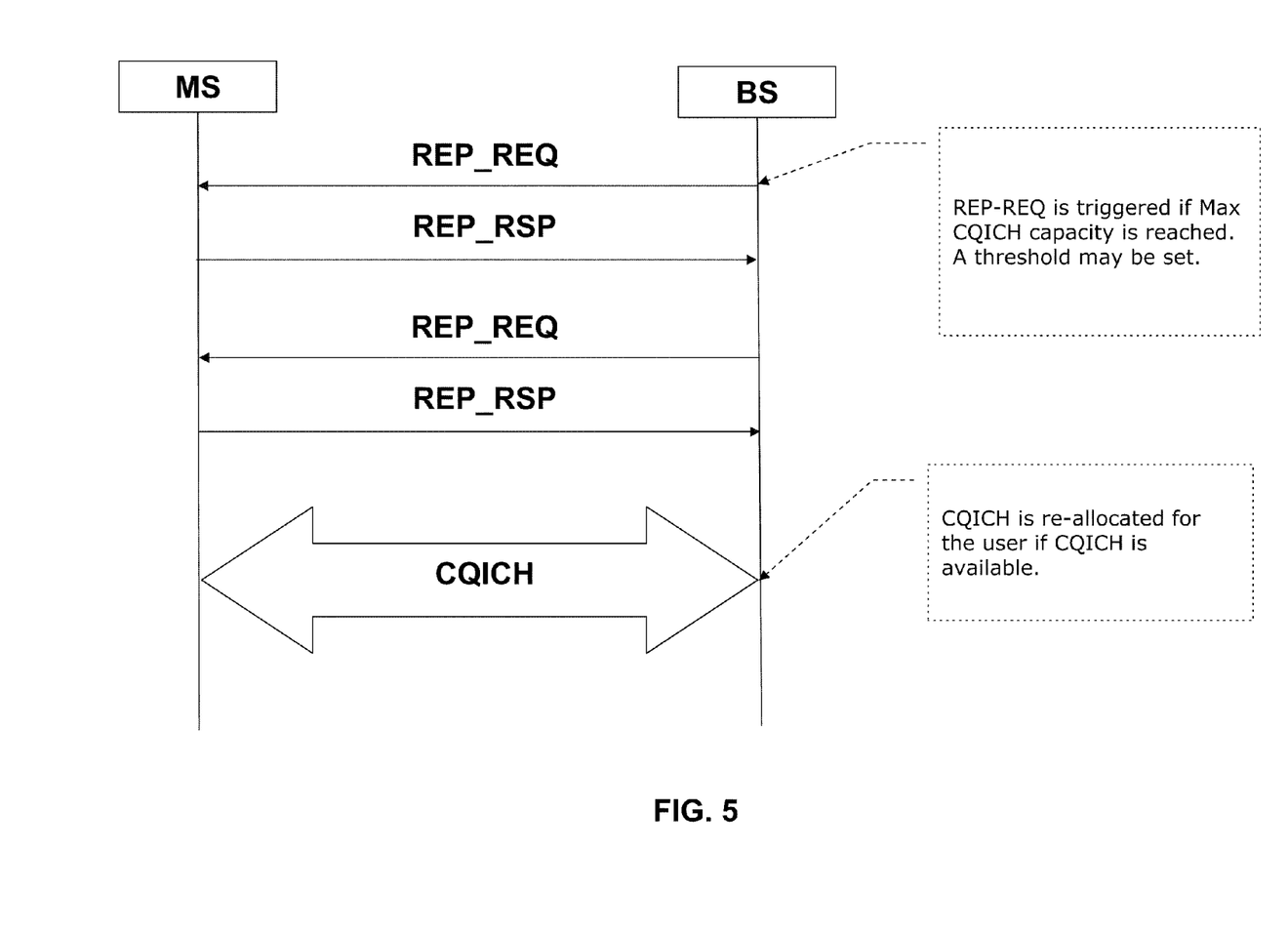
FIG. 5 illustrates various messages transmitted between a SS and a Base Station (BS) in one or more embodiments of this disclosure.

FIG. 5 illustrates MAC level messages between a BS and a MS or SS, and an allocated CQICH. For example, in the case of WiMAX, REP-REQ is triggered by the BS if maximum CQICH capacity is reached. Instead of a maximum capacity being the trigger, a threshold less than the maximum amount may be implemented to ensure reserve capacity is maintained in the system. The MS responds to the REP-REQ by a REP-RSP message. REP-REQ/RSP messaging may continue until a CQI channel again becomes available. Thus, a particular user may transition back and forth between CQICH reporting and MAC level messaging, in contrast to conventional approaches.

As would be recognized by a person with skill in the art, the above processes may be implemented as computer instructions embodied on a physical, tangible computer-readable medium which, when executed by a processor in device 110, or in BS 130, carries out the functionality of the embodiments described above.

Those with skill in the art will appreciate that the inventive concept described herein may work with various system configurations. In addition, various embodiments of this disclosure may be made in hardware, firmware, software, or any suitable combination thereof. As discussed above, various aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of managing network channel quality for a particular user in a wireless communications network, the method comprising:
if one of a plurality of channel quality information channels (CQICH) is available during a first data frame, reporting a channel quality measurement from the particular user to a base station (BS) over the available CQICH, and assigning a modulation coding scheme (MCS) based, at least in part, upon the channel quality measurement;
if a threshold network CQICH capacity is reached during a subsequent data frame and if one of the plurality of CQICH is not available, generating Medium Access Control (MAC) level messages between the BS and the particular user to trigger reporting of signal quality information to the BS by the particular user;
receiving the reported signal quality information at the BS at least until a next CQICH cycle commences and determining whether one of the plurality of CQICH is available during the next CQICH cycle;
if a CQICH is not available during the next CQICH cycle, continuing to receive the signal quality information via the MAC level messages or, otherwise, allocating an available CQICH for reporting the channel quality measurement from the particular user to the BS.

2. The method of claim 1, further comprising:
allocating a CQICH to the particular user during the first data frame;
responsive to the allocated CQICH no longer being available, generating MAC level messages by the particular user during a second data frame; and
responsive to one of the plurality of channel quality information channels subsequently being available, allocating a different CQICH to the particular user during a subsequent data frame.

3. The method of claim 1, wherein the threshold network CQICH capacity is a maximum CQICH capacity of the wireless communications network.

4. The method of claim 1, wherein the wireless communications network is a WiMAX network and the MAC level messages comprise REP-REQ/RSP messages.

5. The method of claim 1, wherein the wireless communications network is an LTE network.

6. The method of claim 1, wherein a CQICH cycle length comprises a predetermined number of frames, the method further comprising, for the particular user, extending a period of the CQICH cycle to be greater than the predetermined number of frames; and using REP-REQ/RSP messaging on selected frames in the extended period where a CQICH is unavailable.

7. A system for wireless packet-based communications, the system comprising:
a base station (BS) and a subscriber station (SS) arranged to communicate over a wireless network,
wherein the BS is configured to:
allocate an available channel quality information channel (CQICH) to the SS during a first data frame and, if a threshold network CQICH capacity is reached during a subsequent data frame such that a CQICH is not available to the SS, or if a CQICH is not available during the first data frame, generate a first Medium Access Control (MAC) level message to the SS to trigger reporting of signal quality information to the BS by the SS using a second MAC level message, and determine whether a different CQICH is available during a next CQICH cycle;
wherein the SS is configured to:
if a CQICH is available during the first data frame, report a channel quality measurement to the BS over the allocated CQICH, or
responsive to the first MAC level message, report the signal quality information to the BS using the second MAC level message at least until the next CQICH cycle commences, and
continue to report the signal quality information via the second MAC level messages if the different CQICH is not available during the next CQICH cycle.

8. The system of claim 7, wherein:
the BS is further configured to:
allocate a CQICH to the SS during the first data frame, and
subsequent to the first data frame, allocate a different CQICH to the SS during a subsequent data frame;
wherein the SS is further configured to:
generate the second MAC level message during a second data frame responsive to the allocated CQICH no longer being available, said second data frame being arranged between the first data frame and the subsequent data frame.

9. The system of claim 7, wherein the threshold network CQICH capacity is a maximum CQICH capacity of the wireless network.

10. The system of claim 7, wherein the wireless network is a WiMAX network, the first MAC level messages is a REP-REQ message, and the second MAC level message is a REP-RSP message.

11. The system of claim 7, wherein the wireless network is an LTE network.

12. The system of claim 7, wherein a CQICH cycle length comprises a predetermined number of frames, wherein the BS is further configured to:
extend a period of, the CQICH cycle for the SS to be greater than the predetermined number of frames; and
use a REP-REQ message on selected frames in the extended period where a CQICH is unavailable for allocation to the SS by the BS.

13. A non-transitory computer-readable medium comprising computer readable code physically embodied thereon which, when executed by a processor, causes the processor to carry out a plurality of operations, the operations comprising:
if one of a plurality of channel quality information channels (CQICH) is available during a first data frame, reporting a channel quality measurement from a user node to a base station (BS) over the available CQICH, and assigning a modulation coding scheme (MCS) based, at least in part, upon the channel quality measurement;
if a threshold network CQICH capacity is reached during a subsequent data frame and if one of the plurality of CQICH is not available, generating Medium Access Control (MAC) level messages between the BS and the user node to trigger reporting of signal quality information to the BS by the user node;
receiving the reported signal quality information at the BS at least until a next CQICH cycle commences and determining whether one of the plurality of CQICH is available during the next CQICH cycle;
if a CQICH is not available during the next CQICH cycle, continuing to receive the signal quality information via the MAC level messages or, otherwise, allocating an available CQICH for reporting the channel quality measurement from the user node to the BS.

14. The computer-readable medium of claim 13, the operations further comprising:
- allocating a CQICH to the user node during the first data frame;
- responsive to the allocated CQICH no longer being available, generating MAC level messages by the user node during a second data frame; and
- responsive to one of the plurality of channel quality information channels subsequently being available, allocating a different CQICH to the user node during a subsequent data frame.

15. The computer-readable medium of claim 13, wherein the threshold network CQICH capacity is a maximum CQICH capacity of the wireless communications network.

16. The computer-readable medium of claim 13, wherein the wireless communications network is a WiMAX network and the MAC level messages comprise REP-REQ/RSP messages.

17. The computer-readable medium of claim 13, wherein the wireless communications network is an LTE network.

18. The computer-readable medium of claim 13, wherein a CQICH cycle length comprises a predetermined number of frames, the operations further comprising:
- for the user node, extending a period of the CQICH cycle to be greater than the predetermined number of frames; and
- using REP-REQ/RSP messaging on selected frames in the extended period where a CQICH is unavailable.

\* \* \* \* \*